United States Patent
Nambudiri et al.

(10) Patent No.: US 7,131,728 B2
(45) Date of Patent: Nov. 7, 2006

(54) METHOD AND APPARATUS FOR DISPLAYING INFORMATION IN AUTOMOTIVE APPLICATION USING A LASER PROJECTION DISPLAY

(75) Inventors: Narayan Nambudiri, Kings Park, NY (US); Paul Dvorkis, East Setauket, NY (US); Ron Goldman, Cold Spring Harbor, NY (US); Carl Wittenberg, Water Mill, NY (US); Chinh Tan, Setauket, NY (US); Miklos Stern, Woodmere, NY (US); Dmitriy Yavid, Stony Brook, NY (US); Frederick F. Wood, Medford, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 183 days.

(21) Appl. No.: 10/836,811

(22) Filed: Apr. 30, 2004

(65) Prior Publication Data
US 2005/0140929 A1    Jun. 30, 2005

(51) Int. Cl.
*G03B 21/00* (2006.01)
*G02B 27/14* (2006.01)
*G02B 27/22* (2006.01)
*H04N 13/00* (2006.01)
*H04N 15/00* (2006.01)

(52) U.S. Cl. .............. 353/13; 353/10; 353/12; 353/14; 359/478; 359/634; 348/44

(58) Field of Classification Search ............ 353/10, 353/12, 13, 14, 31; 359/478, 634; 348/44
See application file for complete search history.

(56) References Cited

U.S. PATENT DOCUMENTS

| | | | |
|---|---|---|---|
| 4,908,611 A * | 3/1990 | Iino | 345/7 |
| 5,029,975 A | 7/1991 | Pease | 350/96.27 |
| 5,311,321 A | 5/1994 | Crowley | 348/760 |
| 5,614,961 A | 3/1997 | Gibeau et al. | 348/750 |
| 5,715,021 A | 2/1998 | Gibeau et al. | 348/750 |
| 5,864,432 A * | 1/1999 | Deter | 359/634 |
| 5,920,361 A | 7/1999 | Gibeau et al. | 348/750 |
| 6,018,408 A | 1/2000 | Hong | 359/201 |
| 6,140,979 A | 10/2000 | Gerhard et al. | 345/7 |
| 6,304,237 B1 | 10/2001 | Karakawa | 345/84 |
| 6,402,321 B1 * | 6/2002 | Harter et al. | 353/14 |
| 6,489,934 B1 | 12/2002 | Klausner | 345/1.1 |
| 2002/0024495 A1 | 2/2002 | Lippert et al. | 345/98 |
| 2002/0024708 A1 | 2/2002 | Lewis et al. | 359/197 |
| 2003/0193651 A1 * | 10/2003 | Egle | 353/31 |

FOREIGN PATENT DOCUMENTS

WO    WO 03/005733 A1    1/2003
WO    WO 2004/064410 A1    7/2004

OTHER PUBLICATIONS

International PCT Search Report PCT/US2004/043189 dated Dec. 12, 2004.

* cited by examiner

*Primary Examiner*—Melissa Jan Koval
(74) *Attorney, Agent, or Firm*—Kirschstein, et al.

(57) ABSTRACT

An image projector is supported by a vehicle to project a two-dimensional image on a projection surface, such as a portion of a windshield, an instrument panel, or a seat back, within the vehicle, for viewing by an occupant of the vehicle.

23 Claims, 4 Drawing Sheets

METHOD AND APPARATUS FOR DISPLAYING INFORMATION IN AUTOMOTIVE APPLICATION USING A LASER PROJECTION DISPLAY

BACKGROUND OF THE INVENTION

1. Field of the Invention

This invention relates generally to electronic displays, and, more particularly, to a laser projection display within a vehicle.

2. Description of the Related Art

In a vehicle, considerable information may be presented to the occupants. Some of the information relates to the operating conditions of the vehicle, such as speed, RPMs, temperature, oil pressure and the like, and is generally of substantially continuous interest and importance to at least the driver of the vehicle. Other information, may relate to more transitory events, such as alarms, warning conditions, and the like, and their importance may be high but not of continuous interest. Finally, other information may be considered entertainment, such as a radio or DVD player, and its importance may be substantially reduced, depending on other factors.

Typically, these various types of information are presented to the occupants of the vehicle using separate and distinct devices that are specifically designed for that purpose. Typically, a vehicle's speedometer and climate control have two separate displays that are located according to their importance to the driver. Moreover, these devices are typically assigned a position in the vehicle that is relatively permanent. For example, under normal operating conditions the driver of a vehicle may be most interested in the speed of his vehicle. Accordingly, the speedometer is located in a prominent position in the driver'direct field of view. At other times, however, it may be useful for the driver to have access to other more interesting or compelling information. For example, warning information may take precedence over normal operating information, and yet, the warning information may be assigned a less prominent location. Further, entertainment type devices, such as radios and CD players, are assigned the least prominent position relative to the driver. Thus, when the driver operates the radio, his/her attention may be diverted from the primary task of driving the vehicle.

The present invention is directed to overcoming, or at least reducing, the effects of one or more of the problems set forth above.

SUMMARY OF THE INVENTION

In one aspect of the instant invention, an apparatus for displaying information in vehicle is provided. The apparatus comprises a laser projector and a viewing surface positioned to receive a variable image from the laser projector.

BRIEF DESCRIPTION OF THE DRAWINGS

The invention may be understood by reference to the following description taken in conjunction with the accompanying drawings, in which like reference numerals identify like elements, and in which.

Figure 1:
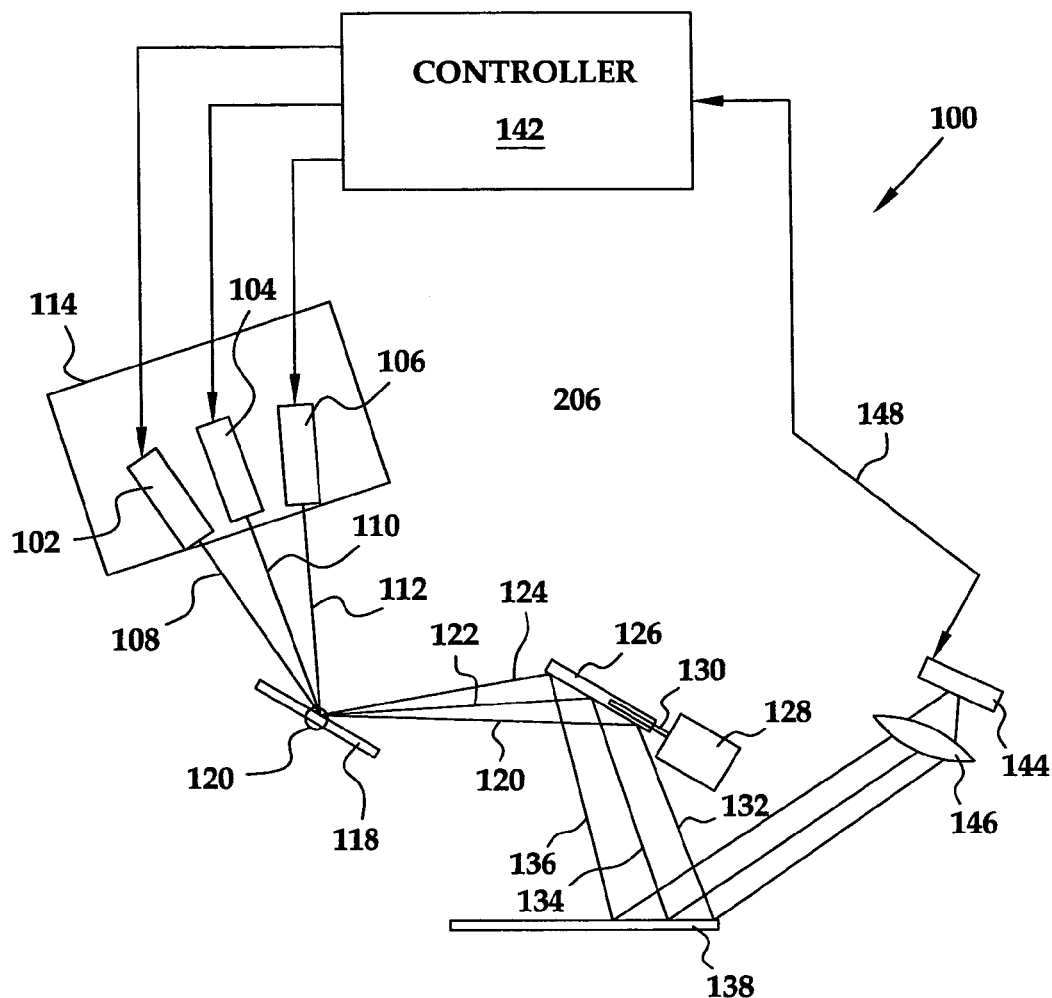
FIG. 1 is a stylistic block diagram of a top level view of one embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Turning now to the drawings, and specifically referring to FIG. 1, a stylistic block diagram of a laser projection display (LPD) 100, in accordance with one embodiment of the present invention, is shown. In the illustrated embodiment, the LPD 100 includes three lasers 102, 104, 106, each capable of emitting a beam of light 108, 110, 112 consisting of a unique color, such as red, green or blue. Those skilled in the art will appreciate that the number of lasers and the color of light emitted therefrom may be varied without departing from the spirit and scope of the instant invention.

The lasers 102, 104, 106 are arranged in a common plane 114 with the beams of light 108, 110, 112 being angularly directed relative to one another to fall on a substantially common location 116 on a first scanning device, such as a first scanning mirror 118, from where they are reflected as beams of light 120, 122, 124. In the illustrated embodiment, the first scanning mirror 118 oscillates on an axis 120 at a relatively high rate (e.g., about 20–30 Khz). Rotation or oscillation of the first scanning mirror 118 causes the beams of light 108, 110, 112 to be moved. That is, as the angular position of the first scanning mirror 118 alters, so to does the angle of reflection of the beams of light 120, 122, 124 from the first scanning mirror 118. Thus, as the mirror oscillates the reflected beams of light 120, 122, 124 are scanned to produce movement of the beams of light 120, 122, 124 along one component of the two-dimensional display.

The second component of the two-dimensional display is produced by a second scanning device, such as a mirror 126. In the illustrated embodiment, the second mirror 126 is coupled to a motor 128 at a pivot point 130 so as to produce rotational or oscillating movement about an axis that is substantially orthogonal to the axis of rotation of the first mirror 118. The beams of light 120, 122, 124 are reflected off of the second mirror 126 as beams of light 132, 134, 136 and directed to a viewing surface 138. The viewing surface 138 may take on any of a variety of forms without departing from the spirit and scope of the instant invention. For example, the viewing surface 138 may be a fixed screen that may be front or back lit by the lasers 102, 104, 106 and may be contained in a housing (not shown) that is common with the LPD 100, or alternatively, the viewing surface 138 may take the form of any convenient, generally flat surface, such as a wall or screen, spaced from the LPD 100.

Figure 2:
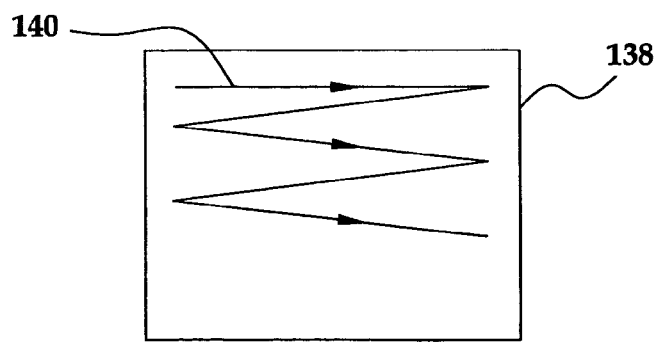
FIG. 2 is a stylistic view of a viewing surface shown in FIG. 1.

The second mirror 126 oscillates or rotates at a relatively slow rate, as compared to the rate of the first mirror 118 (e.g., 60 hz). Thus, it will be appreciated that, as shown in FIG. 2, the beams of light 132, 134, 136 generally follow a path 140 on the display surface 138. Those skilled in the art will appreciate that the path 140 is similar in shape and concept to a raster scan commonly employed in cathode ray tube televisions and computer monitors.

While the instant invention is described herein in the context of an embodiment that employs separate first and second scanning mirrors 118, 126, those skilled in the art will appreciate that a similar path 140 may be produced by using a single mirror. The single mirror would be capable of being moved about two axis of rotation to provide the fast and slow oscillating movements along two orthogonal axes.

As is apparent from FIG. 1, owing to the angular positioning of the lasers 102, 104, 106, even though the lasers 102, 104, 106 have been arranged mechanically and optically to deliver the beams of light 108, 110, 112 within the same plane 114 and at the same point (on the rotational axis 120) on the mirror 118), each has a different angle of reflection, which causes the beams of light 120, 122, 124 to diverge. A controller 142 is provided to controllably energize the lasers 102, 104, 106 to effectively cause the beams of light 120, 122, 124 to be collinear, such that they may be reflected off of the second mirror 126 and delivered to the same point on the viewing surface 138 relatively independent of the distance of the viewing surface 138 from the second mirror 126.

Figure 3A:
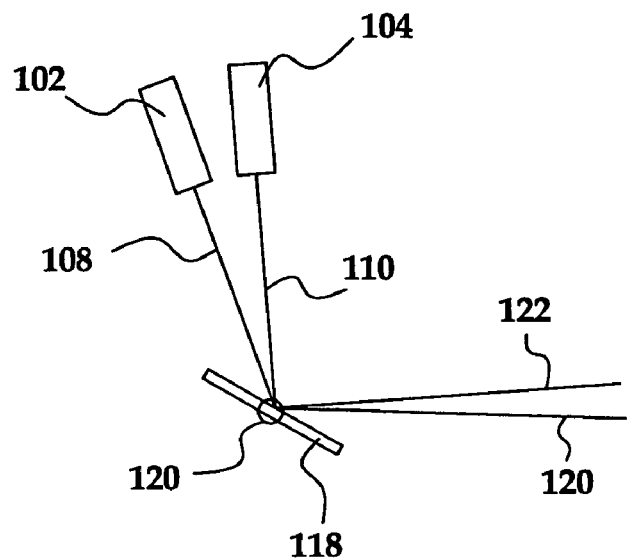
FIG. 3 depicts one embodiment of a vehicle dashboard employing aspects of the instant invention.
Figure 3B:
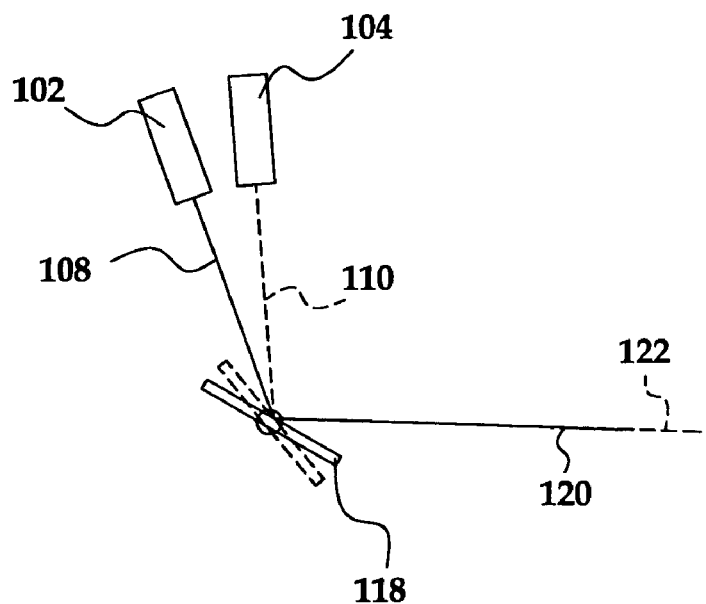

Turning now to FIGS. 3A and 3B, the operation of the controller 142 to cause the beams of light 120, 122, 124 to be collinear is discussed. To simplify the discussion, only two lasers 102, 104 are illustrated in FIG. 3, but those skilled in the art will appreciate that the concepts discussed herein may be extended to three or more lasers without departing from the spirit and scope of the instant invention. As shown in FIG. 3A, if the lasers 102, 104 are energized simultaneously, the reflected beams of light 120, 122 diverge. However, as shown in FIG. 3B, if the lasers 102, 104 are energized at slightly different times, then the beams of light 120, 122 can be made to follow a single, common path (i.e., the beams of light 120, 122 are collinear). For example, if the laser 102 is energized at a first time t1, then the mirror 118 will be at a first position, as represented by the solid lines, and the beam of light 108 will reflect off of the mirror 118 as the beam of light 120. Subsequently, if the laser 104 is energized at a second time t2, then the mirror 118 will be at a second position, as represented by the dashed lines, and the beam of light 110 will reflect off of the mirror 118 as the beam of light 122. By precisely controlling the time t2, the mirror 118 will be in a position to accurately reflect the beam of light 122 along substantially the same path as the beam of light 120.

Thus, through the operation of the controller 142, the beams of light 120, 122 are substantially collinear, but are slightly displaced in time. That is, the beams of light 120, 122 will now both be projected onto substantially the same point on the display surface 138, but at slightly different times. However, owing to the persistence of the human eye, the variation in timing is not detectable. That is, in the case of the three laser system described in FIG. 1, each of the lasers 102, 104, 106 will controllably deliver laser light of a unique color and intensity to substantially the same point on the viewing surface 138 within a relatively short window of time. The human eye will not detect the three separate colors, but rather will perceive a blending of the three light beams such that a consistent and desired hue appears at that point on the viewing surface. Those skilled in the art will appreciate that this process may be repeated numerous times along the path 140 to recreate a picture on the viewing surface 138.

Returning to FIG. 1, a photodetector 144 is arranged to receive laser light reflected from the viewing surface 138. The photodetector 144 may take any of a variety of forms, including a single photosensitive element or a plurality of photosensitive elements arranged in a grid. In some embodiments, it may be useful to include a mechanical/optical system 146 to focus the reflected laser light onto the photodetector 144.

The photodetector 144 is coupled to the controller 142 via a line 148. Signals indicative of the magnitude of the reflected laser light detected by the photodetector 144 may be communicated to the controller 142 over the line 148. In some instances, such as when the photodetector 144 is composed of a grid or an array of photosensors or photosensitive elements, it may be useful to also convey information regarding the location of the reflected laser light. As discussed in more detail in conjunction with FIG. 4, the controller 142 may use the information regarding the magnitude of the reflected laser light to generally determine if conditions within the transmission path of the lasers have changed, such as by being interrupted by a person or object. The controller 142 may use information regarding such an event to determine if the viewing surface has been touched. That is, the viewing screen may be rendered "touch sensitive," and thus, may provide a form of feedback from an operator.

The controller 142 may display a pushbutton or other accessible icon on the viewing surface, and if the controller 142 detects that the portion of the viewing surface displaying the pushbutton has been touched, then the controller 142 may take a responsive action. For example, the controller 142 may display an icon labeled "headlights," and if the controller 142 detects that a user has touched the "headlights" icon, the controller may turn on the headlights. Similarly, numerous other functions may be implemented by way of appropriately configured or labeled icons displayed on the viewing surface.

Figure 4:
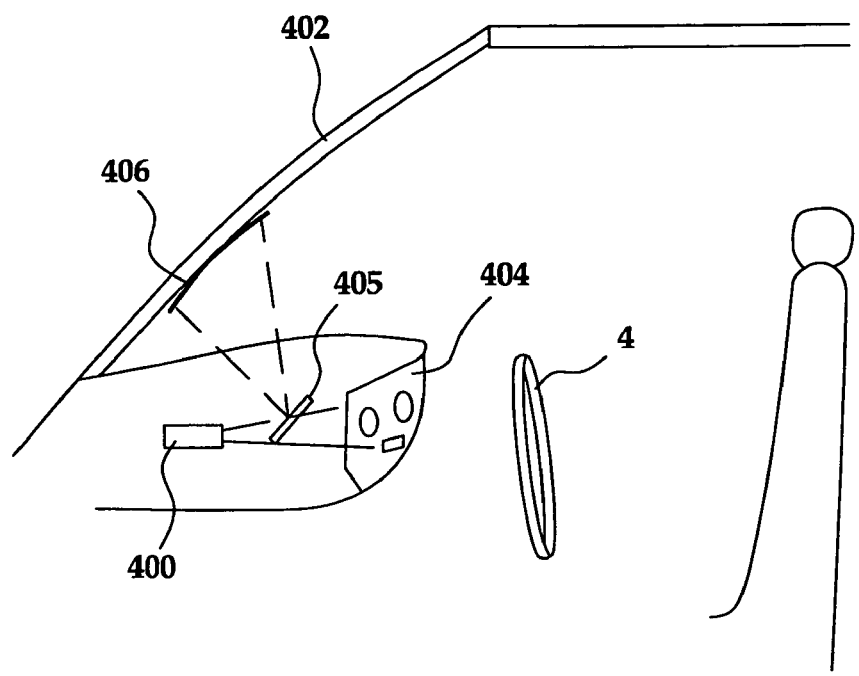
FIG. 4 depicts an alternative embodiment of a vehicle dashboard employing aspects of the instant invention.

The viewing surface 138 may take any of a variety of forms, and may be either frontlit or backlit. One embodiment of a vehicle dashboard employing aspects of the instant invention is shown in FIG. 4. In the illustrated embodiment, an LPD 400 is positioned to display one or more images on a windshield 402 and/or on an instrument panel 404. The LPD 400 projects an image that is at least partially reflected via a mirror 405 upwards onto an interior surface of the windshield 402. In some embodiments, the interior surface of the windshield 402 may have a region 406 that is treated to enhance the visibility of the image seen by the driver of the vehicle. For example, the region 406 may have a reflective material applied thereto so that at least a portion of the laser light transmitted by the LPD 400 will be reflected off the windshield 402 and be visible to the driver. In this manner, the LPD 400 may be used to produce a "heads up" display for presenting information to the driver of the vehicle.

At least a portion of the display projected by the LPD 400 may pass through or around the mirror 405 to reach a rear surface of an instrument panel 404. In the illustrated embodiment, the instrument panel may be constructed or formed from a material that may be backlit by the LPD 400 and viewed by the driver of the vehicle. That is, at least a portion of the laser light striking a rear surface of the instrument panel 404 will pass therethrough and be visible on a front surface of the instrument panel 404.

Those skilled in the art will appreciate that a variety of icons or images may be displayed on the windshield 402 and/or the instrument panel 404 to convey information to the driver of the vehicle and to provide an interface that allows the driver to control the operation of the vehicle or subsystems contained therein, or to modify the appearance and location of information and/or icons displayed on the instrument panel 404 or the windshield 402. The driver may arrange the instruments displayed on his/her dashboard according to personal preference, such as by selecting one of a series of preselected arrangements, or by customizing the appearance of the instruments. For example, the location of an instrument may be modified by a "drag and drop" operation. The driver may select an instrument by touching the instrument panel where the instrument is displayed and then dragging his finger to a new, more desirable location.

Additionally, the controller 142 may be programmed with a preselected or customizable priority scheme regarding the location and brightness of certain instruments/information. That is, under normal operating conditions it may be useful to display the vehicle speed in a prominent location on the instrument panel 404 or windshield 402. However, if certain conditions are detected, then the controller 142 may, at least temporarily, reorganize the display to feature new, significant information. For example, if the outside temperature is detected to have fallen to the freezing point, it may be beneficial to display this information prominently on the instrument panel 404 or windshield 402 to better gain the attention of the driver. Warning information regarding the condition of the vehicle may be treated similarly. For example, information regarding an overheating engine may be displayed with a large, bright or even flashing icon.

Figure 5:
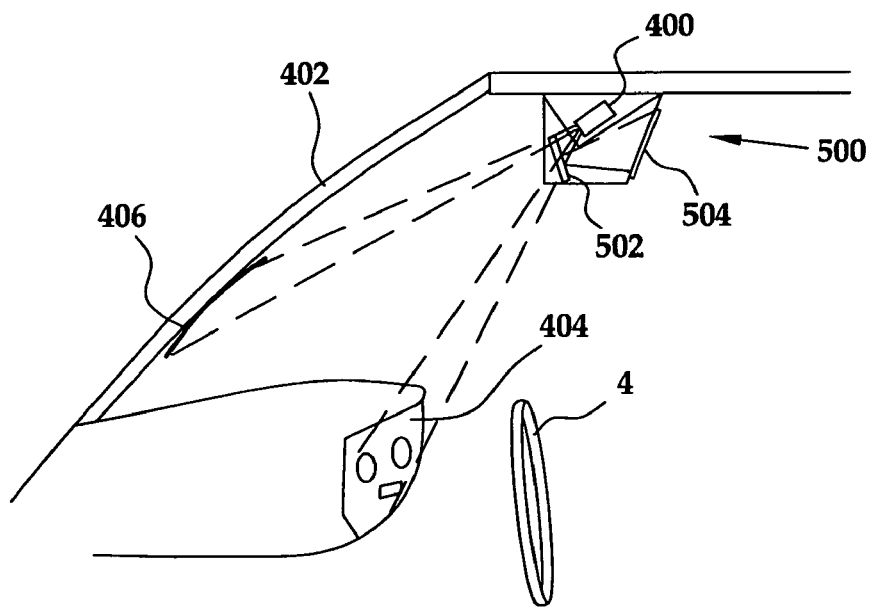
FIG. 5 depicts one embodiment of a rear seat entertainment system deployed in a vehicle employing aspects of the instant invention.

Turning now to FIG. 5, an alternative embodiment of a layout for the LPD 400 is shown. In this embodiment, the LPD 400 is located so that both the instrument panel 404 and the windshield 402 are frontlit. The LPD 400 may also be used to display images for an entertainment system 500 viewable by the occupants of the rear seat of the vehicle. A mirror 502 may be positioned to receive at least a portion of the laser light projected by the LPD 400 and reflect it onto a rear surface of a backlit screen 504. The LPD 400 may then be used to display movies, television programs, games, videophone images, or the like.

Figure 6:
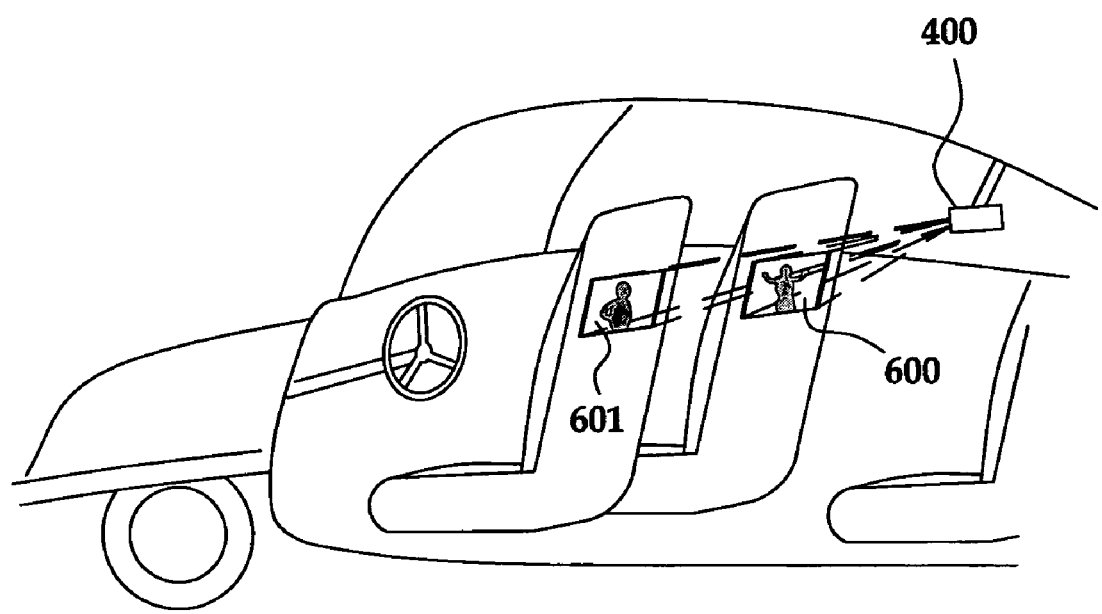
FIG. 6 depicts an alternative entertainment system.

FIG. 6 illustrates an alternative entertainment system 600 in which the LPD 400 is positioned to project a display on a first and second frontlit screen 601, 602. The screens 601, 602 may be located on a rear surface of the front driver and passenger seats. In this manner, the LPD 400 may display movies, television programs, games, videophone images, or the like on the screens 601, 602. Moreover, the same or different images may be displayed on the two screens 601, 602. The first scanning mirror 118 (see FIG. 1) of the LPD 400 may be configured to scan laser light horizontally (and vertically) across both of the screens 601, 602. The controller 142 may be programmed to turn off the lasers during the time that the mirror 118 is directed to the region between the screens 601, 602, thereby producing two separate images on the two screens 601, 602. The two images may use a common source so that both images are identical, or they may use separate sources to produce two unrelated images. For example, the screen 601 may be used to display a movie, while the screen 602 may be used to display a video game.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system'registers and memories into other data similarly represented as physical quantities within the computer system'memories or registers or other such information storage, transmission or display devices.

Those skilled in the art will appreciate that the various system layers, routines, or modules illustrated in the various embodiments herein may be executable control units. The control units may include a microprocessor, a microcontroller, a digital signal processor, a processor card (including one or more microprocessors or controllers), or other control or computing devices. The storage devices referred to in this discussion may include one or more machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy, removable disks; other magnetic media including tape; and optical media such as compact disks (CDs) or digital video disks (DVDs). Instructions that make up the various software layers, routines, or modules in the various systems may be stored in respective storage devices. The instructions when executed by the control units cause the corresponding system to perform programmed acts.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. Consequently, processing circuitry required to implement and use the described system may be implemented in application specific integrated circuits, software-driven processing circuitry, firmware, programmable logic devices, hardware, discrete components or arrangements of the above components as would be understood by one of ordinary skill in the art with the benefit of this disclosure. It is therefore evident that the particular embodiments disclosed above may be altered or modified and all such variations are considered within the scope and spirit of the invention. Accordingly, the protection sought herein is as set forth in the claims below.

We claim:

1. An arrangement for projecting an image inside a vehicle having an instrument panel, comprising:
   a) an image projector supported by the vehicle, and operative for scanning a light beam along mutually orthogonal directions to project a two-dimensional image; and
   b) a light-transmissive projection surface mounted on the instrument panel and having rear and front surfaces, and operative for receiving the image projected by the image projection on the rear surface, and for displaying the image on the front surface for viewing by an occupant of the vehicle.

2. An arrangement for projecting an image inside a vehicle having a windshield and an instrument panel, comprising:
   a) an image projector supported by the vehicle, and operative for scanning a light beam along mutually orthogonal directions to project a two-dimensional image; and
   b) a projection surface supported by the vehicle, the projection surface including a first display surface on an interior surface portion of the windshield, and a second display surface on the instrument panel, the projection surface being operative for displaying the image projected on the first and the second display surfaces of the projection surface for viewing by an occupant of the vehicle.

3. The arrangement of claim 2, wherein the interior surface portion of the windshield is reflective to reflect the projected image to the vehicle occupant.

4. The arrangement of claim 2, and a mirror for reflecting a part of the image to the first display surface, and another part of the image to the second display surface.

5. The arrangement of claim 2, wherein the image projector is mounted at an overhead location within the vehicle, and wherein the projection surface includes a third display surface facing away from the windshield.

6. An arrangement for projecting an image inside a vehicle, comprising:
   a) an image projector supported by the vehicle, and operative for scanning a light beam along mutually orthogonal directions to project a two-dimensional image including an icon relating to the vehicle; and
   b) a projection surface supported by the vehicle, and operative for displaying the image including the icon projected onto the projection surface for viewing by an occupant of the vehicle.

7. The arrangement of claim 6, wherein the projection surface is an interior surface portion of a windshield of the vehicle.

8. The arrangement of claim 7, wherein the interior surface portion of the windshield is reflective to reflect the projected image to the vehicle occupant.

9. The arrangement of claim 6, wherein the projection surface is mounted on an instrument panel of the vehicle.

10. The arrangement of claim 9, wherein the projection surface is light-transmissive and has rear and front surfaces, and wherein the image projector projects the image onto the rear surface, and wherein the image is viewable to the vehicle occupant on the front surface of the projection surface.

11. The arrangement of claim 6, wherein the projection surface includes a first display surface on an interior surface portion of a windshield, and a second display surface on an instrument panel; and wherein the image projector is operative for projecting the image on the first and the second display surfaces.

12. The arrangement of claim 11, and a mirror for reflecting a part of the image to the first display surface, and another part of the image to the second display surface.

13. The arrangement of claim 11, wherein the image projector is mounted at an overhead location within the vehicle, and wherein the projection surface includes a third display surface facing away from the windshield.

14. The arrangement of claim 6, wherein the projection surface is mounted at an overhead location within the vehicle.

15. The arrangement of claim 6, wherein the projection surface is located at a seat back of the vehicle.

16. The arrangement of claim 6, wherein the projection surface is located across two seat backs of the vehicle.

17. The arrangement of claim 6, and a detector for detecting when the icon has been touched, and a controller for controlling the vehicle in response to detection of the touching of the icon.

18. The arrangement of claim 6, wherein the image projector includes a laser for emitting a laser beam as the light beam.

19. The arrangement of claim 6, wherein the image projector includes a plurality of lasers of different wavelengths for emitting a composite laser beam as the light beam.

20. A method of projecting an image inside a vehicle having an instrument panel, comprising the steps of:
   a) supporting an image projector by the vehicle, and scanning a light beam along mutually orthogonal directions to project a two-dimensional image; and
   b) mounting a light-transmissive projection surface on the instrument panel, receiving the image projected by the image projector on a rear surface of the projection surface, and displaying the image on a front surface of the projection surface for viewing by an occupant of the vehicle.

21. A method of projecting an image inside a vehicle having a windshield and an instrument panel, comprising the steps of:
   a) supporting an image projector by the vehicle, and scanning a light beam along mutually orthogonal directions to project a two-dimensional image; and
   b) supporting a projection surface by the vehicle, providing a first display surface on an interior surface portion of the windshield, providing a second display surface on the instrument panel, and displaying the image projected on the first and the second display surfaces of the projection surface for viewing by an occupant of the vehicle.

22. A method of projecting an image inside a vehicle, comprising the steps of:
   a) supporting an image projector by the vehicle, and scanning a light beam along mutually orthogonal directions to project a two-dimensional image including an icon relating to the vehicle; and
   b) supporting a projection surface by the vehicle, and displaying the. image including the icon projected onto the projection surface for viewing by an occupant of the vehicle.

23. The method of claim 22, and detecting when the icon has been touched, and controlling the vehicle in response to detection of the touching of the icon.

* * * * *